United States Patent
Williams et al.

(10) Patent No.: US 12,460,063 B2
(45) Date of Patent: Nov. 4, 2025

(54) RECOVERY AND REUSE OF ACID DIGESTED AMINE/EPOXY-BASED COMPOSITE MATRICES

(71) Applicant: UNIVERSITY OF SOUTHERN CALIFORNIA, Los Angeles, CA (US)

(72) Inventors: Travis J. Williams, Los Angeles, CA (US); Steven Nutt, Los Angeles, CA (US); Yijia Ma, Los Angeles, CA (US); Carlos Navarro, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 699 days.

(21) Appl. No.: 17/761,856

(22) PCT Filed: Sep. 18, 2020

(86) PCT No.: PCT/US2020/051413
§ 371 (c)(1),
(2) Date: Mar. 18, 2022

(87) PCT Pub. No.: WO2021/055692
PCT Pub. Date: Mar. 25, 2021

(65) Prior Publication Data
US 2022/0363863 A1 Nov. 17, 2022

Related U.S. Application Data

(60) Provisional application No. 62/902,158, filed on Sep. 18, 2019.

(51) Int. Cl.
*C08J 11/26* (2006.01)
*C08G 59/20* (2006.01)
(Continued)

(52) U.S. Cl.
CPC ............... *C08J 11/26* (2013.01); *C08G 59/20* (2013.01); *C08G 59/4035* (2013.01);
(Continued)

(58) Field of Classification Search
CPC ........ C08J 11/26; C08J 11/16; C08J 2363/00; C08G 59/20; C08G 59/50; C08G 59/4035
(Continued)

(56) References Cited

U.S. PATENT DOCUMENTS 6,465,531 B1 10/2002 Thai et al.
10,752,748 B2 * 8/2020 Liang ........................ C08J 11/26
(Continued)

OTHER PUBLICATIONS

Ma et al "Chemical treatment for recycling of amine/epoxy composites at atmospheric pressure ", Polymer Degradation and Stability , 153, (2018), pp. 307-317 (Year: 2018).*
(Continued)

*Primary Examiner* — Arrie L Reuther
(74) *Attorney, Agent, or Firm* — Brooks Kushman P.C.

(57) ABSTRACT

A method for recycling matrix residues includes steps of degrading a target epoxy to form matrix residues, collecting the matrix residues, and adding the matrix residues into a polymer-forming formulation. Characteristically, the polymer-forming formulation includes multifunctional anhydride monomers and polyfunctional co-reactant monomers.

31 Claims, 12 Drawing Sheets

(51) Int. Cl.
  *C08G 59/40*  (2006.01)
  *C08G 59/50*  (2006.01)
  *C08J 11/16*  (2006.01)

(52) U.S. Cl.
  CPC .............. *C08G 59/50* (2013.01); *C08J 11/16* (2013.01); *C08J 2363/00* (2013.01)

(58) Field of Classification Search
  USPC .......................................................... 521/40
  See application file for complete search history.

(56) References Cited

U.S. PATENT DOCUMENTS

2016/0264718 A1* 9/2016 Qin ...................... C08G 59/245
2017/0145180 A1* 5/2017 Liang ....................... C08J 11/26
2019/0203013 A1* 7/2019 Williams ............... C08K 3/012

OTHER PUBLICATIONS

Nakagawa et al. "CFRP Recycling Technology Using Depolymerization Under Ordinary Pressure", Hitachi Chemical Technical Report, No. 56, (2014), pp. 6-11. (Year: 2014).*

Ma, Y. et al., "Chemical Treatment for Recycling Amine/Epoxy Composites at Atmospheric Pressure," Polymer Degradation and Stability (2018), v. 153, pp. 307-317.

Nakagawa, M. et al., "CFRP Recycling Technology Using Depolymerization Under Ordinary Pressure," Hitachi Chemical Technical Report (2014), n. 56, pp. 6-11.

Navarro, C.A. et al., "Catalytic, Aerobic Depolymerization of Epoxy Thermoset Composites," Supplemental Materials, Royal Society of Chemistry (2021), 11 pgs.

Navarro, C.A. et al., "Catalytic, Aerobic Depolymerization of Epoxy Thermoset Composites," Green Chem. (2021), 23, pp. 6356-6360.

Int'l Search Report & Written Opinion dated Jan. 6, 2021 for PCT Appn. No. PCT/US2020/051413, 10 pgs.

Ma, Y. et al., "Recovery and reuse of acid digested amine/epoxy-based composite matrices," Polymer Degradation and Stability 175 (2020), pp. 1-8.

Navarro, C.A. et al., "Mechanism and Catalysis of Oxidative Degradation of Fiber-Reinforced Epoxy Composites," Topics in Catalysis (2018), 62, pp. 704-709.

EP Supplemental Search report dated Sep. 13, 2023 for EP Appn. No. 20865901.1 (filed Mar. 23, 2022), 10 pgs.

* cited by examiner

RECOVERY AND REUSE OF ACID DIGESTED AMINE/EPOXY-BASED COMPOSITE MATRICES

CROSS-REFERENCE TO RELATED APPLICATIONS

This application is the U.S. national phase of PCT Appln. No. PCT/US2020/051413 filed Sep. 18, 2020, which claims the benefit of U.S. Provisional Patent Application No. 62/902,158 filed Sep. 18, 2019, the disclosures of which are hereby incorporated in their entirety by reference herein.

TECHNICAL FIELD

In at least one aspect, the present invention is related to methods for recovering and reusing amine/epoxy-based composites.

BACKGROUND

The increasing use of carbon fiber-reinforced polymer (CFRP) composites poses severe environmental problems. Presently, most end-of-life CFRP material is sent to landfills because there is no process technology for sustainable recycling. This issue is expected to escalate as the market for CFRPs expands [1]. Current composite recycling methods focus on recovery and reuse of the carbon fibers (only), typically by incorporating into molding compounds or stitched mats for second-use applications [2-5]. Polymer matrices in CFRPs can be of substantial value, yet they are far more difficult to recover than fibers, and few have attempted to develop reuse approaches for matrices. The absence of viable reuse routes for polymer matrices generates new sources of waste after recycling/re-use of carbon fibers, especially for recycling methods that require the use of chemical reagents.

In previous studies, we demonstrated recovery of near-virgin-quality carbon fiber fabrics/arrays from amine-cured epoxy composites using oxidative acid peroxide digestion at atmospheric pressure [6-11]. The reaction mechanism for acid digestion was identified, and target catalysts were evaluated to accelerate the reaction rate [12]. In the present study, we focus on recovering the depolymerized matrix materials from digestion solutions after depolymerization and demonstrating routes for reusing these products in virgin resin formulations, effectively closing the recycling loop with minimal downcycling. Such reuse strategies may also be applied to amine/epoxy matrix residues recovered from other recycling methods.

Pyrolysis is presently the most widely used recycling method for CFRPs in industry, because the process leverages existing technology, and composite materials with various matrices are readily incorporated. Through pyrolysis, composite matrices are decomposed into lower molecular weight components at 450-700° C. The lower molecular weight organics are burned in a combustion chamber, allowing the energy produced to be captured and reused as a supplementary energy source for pyrolysis. However, the value recovered from polymer matrices through combustion is trivial. Furthermore, data show that high temperatures can lead to fiber degradation. Pyrolysis can reduce the tensile strength of recovered fibers by >30% and leave char residue on fiber surfaces [13]. Consequently, recent effort has focused on developing chemical recycling approaches that recover residue-free fibers with >90% tensile strength retention [14-24]. Chemical recycling by selective depolymerization enables recovery of both high-quality carbon fibers and a processable mixture of solvents, catalysts, and cleaved matrix residues from which further value can be recovered. Fully utilizing such mixtures obviates adverse environmental impact, opens new fine chemical feedstocks, and increases the overall process sustainable.

Efforts to develop strategies for reuse of decomposed polymer matrix residue after chemical recycling of CFRPs have been reported in the literature. For example, Okajima et al studied mixtures of decomposed polymer matrices and virgin epoxy resins [22]. The matrices for recycling and for mixing with matrix residues were both anhydride-based epoxies, with triethylamine as the promoter. They reported that the strength of the blended polymers decreased linearly as the ratio of matrix residue increased. The addition of the decomposed matrix product had to be reduced to <20% to retain 80% flexural strength. Secondly, Liu et al investigated mixing decomposed polymers from amine- and anhydride-cured epoxy composites in anhydride/epoxy systems (with an accelerator) [23-24]. They reported that the glass transition temperature ($T_g$) and flexural strength of the mixed epoxy first increased as the amount of the decomposed matrix loading increased, then decreased. The flexural strength of mixed resins with <15 wt % decomposed amine/epoxy matrix loadings and with <40 wt % decomposed anhydride/epoxy matrix loadings were greater than or similar to virgin polymer samples. Similar trends were reported by Dang et al when mixing the neutralized matrix extracts from amine-cured epoxy composites in anhydride-cured epoxies [25]. The flexural strength of the blended resins was evaluated for different decomposed matrix contents, typically at 5-30 wt %.

When decomposed matrix residues are used as fillers in virgin resin formulations, the resulting polymers have shown acceptable properties, provided the mixing ratios are suitably low. However, the matrix residues recovered from CFRPs are not reused as an essential component of anything. Thus, to increase sustainability, reuse approaches for matrix residues must be developed. Moreover, the reaction mechanism for oxidative acid digestion differs from the methods reported in previous studies, leading to recovery of matrix residues with distinct molecular structures and functional groups.

Accordingly, there is a need for improved methods for reusing polymeric matrix residues from carbon fiber-reinforced polymer composites, and in particular epoxy-based composites.

SUMMARY

In at least one aspect, the present invention is directed to recovering the decomposed matrix residues after oxidative acid digestion at atmospheric pressure. The feasibility of reusing the matrix residue as value-added components in second-use epoxy resin formulations is demonstrated. The decomposed polymer matrix residues preserved bisphenol A structures from the acid digestion solution, and the residues were recovered via neutralization and precipitation. Two potential reuse approaches are investigated, including (a) reuse as an accelerator and (b) as a filler for virgin resin formulations. It is demonstrated that the matrix residue could effectively catalyze the curing reaction of an anhydride/epoxy formulation without an accelerator. The flexural properties of anhydride-based epoxies samples cured with the matrix residue are comparable to samples cured with the commercial accelerator. It is shown that the matrix residue could be implemented as fillers for anhydride-cured epoxies with a commercial accelerator, yielding blended polymers with retention of thermal and mechanical properties.

In another aspect, a method for recycling matrix residues is provided. The method includes steps of degrading a target epoxy to form matrix residues, collecting the polymeric matrix residues, and adding the polymeric matrix residues into a polymer-forming formulation. Characteristically, the polymer-forming formulation includes multifunctional anhydride monomers and polyfunctional co-reactant monomers.

In another aspect, another method for recycling matrix residues is provided. The method includes steps of pre-treating a target epoxy in benzyl alcohol to form a permeabilized composite, oxidatively degrading the permeabilized composite to form matrix residues, collecting the matrix residues, and adding the matrix residues into a polymer-forming formulation. The degradation can be accomplished by aerobic manganese, high pressure $^3O_2$, and at lower pressure by $^1O_2$.

Chemical recycling of thermoset composites has been focused largely on recovering high-value carbon fibers with property retention, while recovery and reuse of decomposed polymer matrix residues is generally overlooked, despite the fact that matrix recycling constitutes an essential component of a sustainable approach to the overall problem. Our previous study demonstrated that oxidative acid digestion can be deployed effectively to recover near-virgin quality carbon fibers from amine-cured epoxy composites. In some aspects, the viability of recovery and reuse of the decomposed amine/epoxy residue after acid digestion of the matrix is investigated. This effectively closes the recycling loop. It is found that polymer matrix residues recovered from acid digestion solutions via neutralization and precipitation contain molecular components of the epoxies in which aromatic regions are preserved. The recovered matrix residues are blended into virgin resin formulations and two approaches are evaluate for potential reuse. Approach I utilizes the matrix residue as an accelerator for a virgin anhydride/epoxy formulation that contains no accelerator and thus cannot be self-catalyzed. It is discover that adding matrix residue produces catalytic effects on the curing reaction. In general, anhydride/epoxy samples blended and cured with recovered matrix residues are homogenous and exhibit thermal and mechanical properties comparable to specimens cured with a commercial accelerator. Approach II deployed the matrix residue as a filler for virgin anhydride-based epoxies with a commercial accelerator to produce blended formulations. In such cases, blended formulations yielded acceptable retention of thermal and mechanical properties, provided the fraction of matrix residue added did not exceed 10 wt %.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
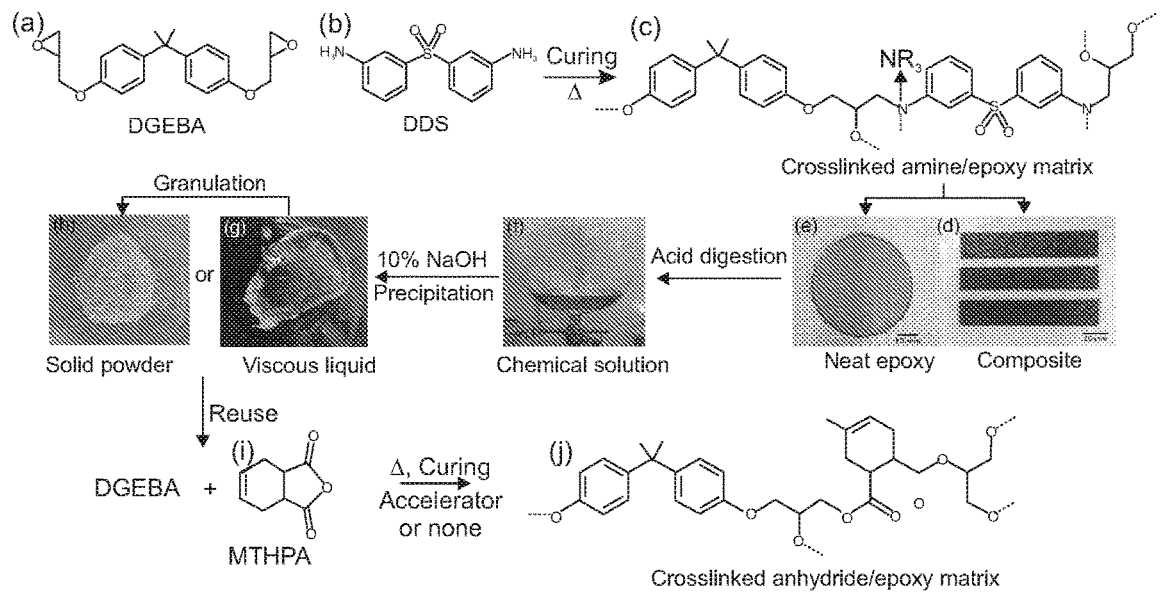
FIG. 1. Recycling and reuse of amine-cured epoxy matrices.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $—NO_2$, $—NH_2$, $—N(R'R'')$, $—N(R'R''R''')^+L^-$, Cl, F, Br, $—CF_3$, $—CCl_3$, $—CN$, $—SO_3H$, $—PO_3H_2$, $—COOH$, $—CO_2R'$, $—COR'$, $—CHO$, $—OH$, $—OR'$, $—O^-M^+$, $—SO_3^-M^+$, $—PO_3^-M^+$, $—COO^-M^+$, $—CF_2H$, $—CF_2R'$, $—CFH_2$, and $—CFR'R''$ where R', R'' and R''' are $C_{1-10}$ alkyl or $C_{6-18}$ aryl groups, $M^+$ is a metal ion, and $L^-$ is a negatively charged counter ion; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R" and R''' are $C_{1-10}$ alkyl or $C_{6-18}$ aryl groups, $M^+$ is a metal ion, and U is a negatively charged counter ion; percent, "parts of," and ratio values are by weight; the term "polymer" includes "oligomer," "copolymer," "terpolymer," and the like; molecular weights provided for any polymers refers to weight average molecular weight unless otherwise indicated: the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +1-5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1 to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

Throughout this application, where publications are referenced, the disclosures of these publications in their entireties are hereby incorporated by reference into this application to more fully describe the state of the art to which this invention pertains.

As used herein the term "resin" refers to a thermoset polymer in the uncured liquid state. During curing (normally by application of heat or other sources of energy), the liquid resin undergoes gelation and vitrification, and becomes the solid matrix. The matrix is a continuous binder phase that binds fiber reinforcements together into a composite. Reinforcements can be continuous or discontinuous fibers, particles or platelets.

In an embodiment, a method for recycling matrix residues derived from epoxies is provided. The method includes a step of degrading a target epoxy to form matrix residues. In a refinement, the matrix residues include polymeric matrix residues. The matrix residues are then collected and typically purified in some manner. The matrix residues are then added into a polymer-forming formulation. Typically, the polymer-forming formulation includes multifunctional anhydride monomers and polyfunctional co-reactant monomers in addition to the added matrix additives. In a refinement, the target epoxy matrix is an amine-cured epoxy. In another refinement, the polymer-forming formulation is an anhydride-based formulation. In this regard, co-reactants facilitate crosslinking and are sometimes referred to as hardeners or curatives. The cross-linking reaction is referred to as curing.

In one variation, the target epoxy matrix is contacted with an acidic solution for a predetermined time period to form a reacted mixture. Although the present variation is not limited to any particular value for the predetermined time period, 30 minutes to 10 hours is typical. In a refinement, the acidic solution includes hydrogen peroxide and acetic acid. The acidic solution has a pH less than about 7 (e.g., 1 to 6.9). This acidic solution is typically neutralized after a desired amount of reaction has taken place. The neutralization can be achieved with an aqueous base (e.g., NaOH, KOH, $Na_2CO_3$, and the like. The viscous liquids and/or solid powder residues are precipitated from the reacted mixture to facilitate their removal. In another refinement, matrix residues are obtained from the reacted mixture by evaporation of the acetic acid. In another refinement, the acidic solution includes acetic acid and is exposed to oxygen. Again, this acidic solution is typically neutralized after a desired amount of reaction has taken place, and optionally, the matrix residues are obtained from the reacted mixture by evaporation of the acetic acid.

In another variation, the target epoxy is contacted with a neutral solution (e.g., a nonacidic) for a predetermined time period to form a reacted mixture. Such a solution can be alcohol based (i.e., a $C_{1-20}$) alcohol. An example of a useful alcohol is benzyl alcohol. The reaction mixture can then be degraded by aerobic manganese, high pressure $^3O_2$, and lower pressure $^1O_2$ as described below.

In another embodiment, another method for recycling matrix residues is provided. The method includes a step of pre-treating a target epoxy (e.g., a composite sample) in benzyl alcohol to form a permeabilized composite. In a refinement, the matrix residues include polymer matrix residues. The permeabilized composite is oxidatively degraded to form matrix residues. In a refinement, the matrix residues are collected. In a further refinement, the matrix residues are added into a polymer-forming formulation, the polymer-forming formulation including multifunctional anhydride monomers and polyfunctional co-reactant monomers. As set forth above, the polymer-forming formulation includes multifunctional anhydride monomers and polyfunctional co-reactant monomers in addition to the added matrix additives. In a refinement, the target epoxy matrix is an amine-cured epoxy. In another refinement, the polymer-forming formulation is an anhydride-based formulation. In this regard, co-reactants facilitate crosslinking and are sometimes referred to as hardeners or curatives. The cross-linking reaction is referred to as curing.

In one variation, the permeabilized composite is degraded with aerobic manganese. The permeabilized composite can then be added to a solution that includes $MnCl_2$. Typically, the solution is an acetic acid solution. In a refinement, the solution includes from 0.1 to 5 weight percent $MnCl_2$. The solution can also include a Lewis acid such as $AlCl_3$. Typically in an amount from 0.1 to 5 weight percent $MnCl_2$. The solution is then contacted with $O_2$ for a predetermined period of time at a reaction temperature (e.g., from about 100 to 140° C.). The predetermined period of time can be from 1 hour to 30 hours or more.

In another variation, the permeabilized composite is contacted with high pressure $^3O_2$. The composite sample is pre-treated in benzyl alcohol at a first elevated temperature (e.g., 140 to 200° C.) for a first predetermined time (e.g., 1 to 10 hours or more) to permeabilize the material. Afterwards, the composite is added to a solution of benzyl alcohol containing $MnCl_2$ (e.g., 1 to 15 wt % $MnCl_2$) and a base (e.g., 2 to 20 equivalents of $K_3PO_4$) in a high pressure reactor. In this context, a high pressure reactor is a reactor than can withstand. The high pressure reactor is pressurized with $O_2$ at a pressure greater than 1 atm $O_2$ (e.g., 2 to 50 atm $O_2$) and allowed to react for at a second elevated temperature. In a refinement, the second elevated temperature is from about 140 to 200° C. The reaction is allowed to proceed for a second predetermined period of time. In a refinement, the second predetermined period of time is 10 to 80 hours or more.

In another variation, the permeabilized composite is photochemically degraded with $^1O_2$. The composite sample is placed in a solution of benzyl alcohol containing a base (e.g., 2 to 20 equivalents of $K_3PO_4$) and optionally rose bengal (0.002 to 0.1 equivalent rose bengal) held in a reactor. After purging, the reactor is placed under an $O_2$ atmosphere, and illuminated for a predetermined period of time (e.g., 1 hour to 100 hours or more). In a further refinement, a light source provide wavelengths in the near ultraviolet, visible, infrared, or combination thereof is deployed.

In one application of the methods set forth above, the matrix residues (e.g., polymer matrix residues) are an activator for the formulation of a thermoset resin system where the matrix residues include amine or hydrazine functional groups. As set forth above, the thermoset resin system is an anhydride-based formulation. In a refinement, the matrix residues are present in an amount of about 1 to 20 weight percent of the polymer-forming formulation. The target epoxy is formed from a multifunctional amino-containing epoxide monomer (e.g., it includes multifunctional amino-containing epoxide monomer residues). Examples of suitable multifunctional amino-containing epoxide monomers include, but are not limited to triglycidyl-p-aminophenol, tetraglycidyl-4,4'-diaminodiphenylmethane, or combinations thereof. The matrix residues after digestion can include resides of multifunctional amino-containing epoxide monomers or hydrazine functionalized derivatives thereof. Examples of these multifunctional amino-containing epoxide monomers include, but are not limited to triglycidyl-p-aminophenol, tetraglycidyl-4,4'-diaminodiphenylmethane, or hydrazine functionalized derivatives thereof, or combinations thereof.

Additional information is found in Yijia Ma, Carlos A. Navarro, Travis J. Williams, Steven R. Nutt, *Recovery and reuse of acid digested amine/poxy-based composite matri-* ces, Polymer Degradation and Stability, Volume 175, May 2020, 109125 (https://doi.org/10.1016/j.polymdegradstab.2020.109125) and it supplemental materials; the entire disclosures of which are hereby incorporated by reference.

The following examples illustrate the various embodiments of the present invention. Those skilled in the art will recognize many variations that are within the spirit of the present invention and scope of the claims.

EXPERIMENTS

Digestion of Amine-Epoxy Matrices

Amine/epoxy resin formulations. A bi-functional epoxy monomer (diglycidyl ether of bisphenol A (DGEBA), FIG. 1 (a), Huntsman) and an amine curing agent (diamine 3,3'-diaminodiphenyl sulfone (3,3'-DDS), FIG. 1 (b), Huntsman) were selected for amine-epoxy formulations. The mixing molar ratios for amine hydrogen/epoxy groups (A/E ratio) were 40% (1:7.5 by weight) for neat epoxies and 100% (1:3 by weight) for composite laminates. Neat epoxies were cured in a convection oven using a cure cycle consisting of a 1.5° C./min ramp to 250° C., followed by a dwell for 0.5 hour. Composite laminates were cured using a cure cycle consisting of a 1.5° C./min ramp rate, a 120° C. dwell of three hours, another 1.5° C./min ramp rate, and a post-cure at 180° C. for three hours. FIG. 1 (c) shows the crosslinked structure of amine-cured epoxy matrices. After cure, the two types of samples, neat epoxies (ca. 40×20×1 mm, pieces cut from FIG. 1 (e)) and composite laminates (100×20×1 mm, FIG. 1 (d)) were subjected to oxidative acid digestion.

Oxidative acid digestion. Oxidative acid digestion was performed at 110° C. using a solution of 100 mL glacial acetic acid (EMD Millipore) and 5 mL $H_2O_2$ solution (30% (w/w) in $H_2O$, EMD Millipore). Additional $H_2O_2$ solution (5 mL) was added to the flask every hour. The reaction times for neat epoxies were 1 h (full dissolution) and 4 h (over-reacted). The reaction time to reach full dissolution for composite laminates was 4 h. After reaction, the chemical feedstock FIG. 1 (f) was neutralized using a 10% sodium hydroxide aqueous solution. Viscous liquid or solid powder residues (FIG. 1 (g)) were subsequently obtained through precipitation. The recovered viscous residues contained traces of acetic acid, which were removed by granulation and washing in water, yielding solid powder residues as well (FIG. 1 (h)). After precipitation, matrix residues were further washed in water and dried at room temperature overnight for reuse. The matrix recovery rate was ca. 25% by weight. Note that matrix residues could also be recovered from solution by evaporating all the acetic acid solvent. However, the matrix residue recovered via evaporation contained much more acetic acid solvent than matrix recovered via neutralization and precipitation and was difficult to reuse in virgin resin formulations.

Reuse of Decomposed Matrix Residues

To reuse recovered matrix residues, specific amounts of the materials were added to virgin anhydride-based epoxy formulations (FIG. 1 (i)) and manually mixed at 100° C. until homogenized. Recovered matrix residues were more compatible with anhydride/epoxy systems than amine/epoxy systems because of the existence of acetic acid solvent.

Figures 2A, 2B, 2C:
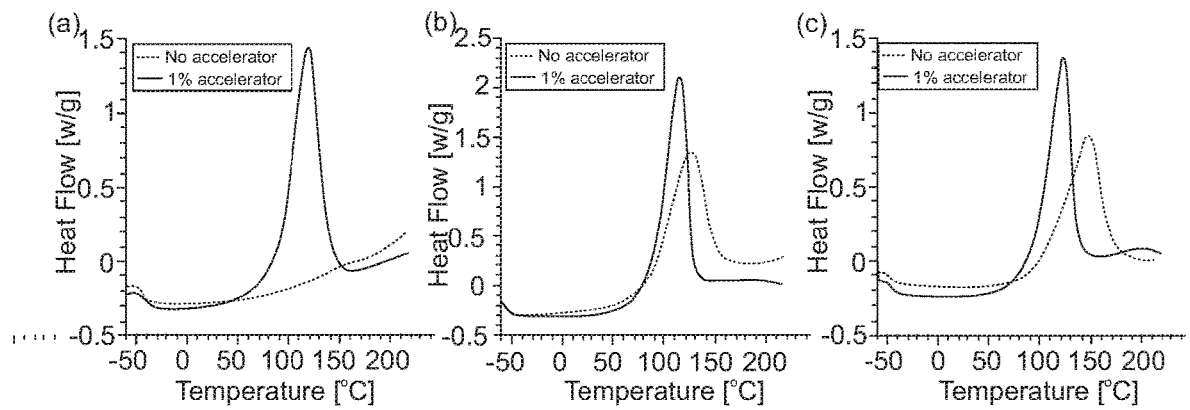
FIGS. 2A, 2B, and 2C. Effect of accelerators on curing reactions of anhydride/epoxy formulations with different epoxy monomers: (A) diglycidyl ether of bisphenol A (DGEBA), (B) triglycidyl of para-aminophenol (TGAP), (C) tetraglycidyl-4,4'-diaminodiphenylmethane (TGDDM)

Two reuse approaches were explored in this section. In Approach I, we reused recovered matrices as an accelerator for anhydride/epoxy formulations. Bi-functional epoxy (DGEBA)/Anhydride systems without an accelerator generally have low reactivity (FIG. 2A), and thus the curing must be carried out in the presence of Lewis bases (such as tertiary amines) to catalyze the reaction [26-27]. In contrast, tri-(triglycidyl of para-aminophenol (TGAP)) and tetra-(tetraglycidyl-4,4'-diaminodiphenylmethane (TGDDM)) functional epoxy/anhydride systems contain tertiary amines in the epoxy monomers, and thus are self-catalyzed during cure (FIGS. 2B and C). Material recovered from amine-cured epoxies contain tertiary amines, and potentially these can be used as accelerators for the aforementioned anhydride-cured bi-functional epoxies. Therefore, anhydride/DGEBA resins without a commercial accelerator were formulated to evaluate the feasibility of using recovered matrices as an accelerator. The molar ratio for anhydride/epoxy groups was 100% (9:10 by weight). In Approach II, we reused recovered matrices as a filler for anhydride/DGEBA formulations with a commercial accelerator (1-methylimidazole, Huntsman). The molar ratio for anhydride/epoxy groups was also 100%. The mixing ratios of recovered matrices ranged from 2.5-10 wt % in Approach I, and 5-10 wt % in Approach II.

Characterization

Characterization of recovery products was performed using multiple techniques. Modulated differential scanning calorimetry (MDSC, TA Instruments Q2000) was performed to analyze the cure reaction and the glass transition temperature ($T_g$) of epoxy samples after cure. Nuclear magnetic resonance spectroscopy (NMR) was used to determine the chemical structures of the recovered polymers after chemical treatment. The dried sample was dissolved in deuterated organic solvents, filtered through cotton to remove insoluble solids, and analyzed by NMR. Fourier-transform infrared spectroscopy (FTIR, Nicolet 4700) was used to monitor the crosslinking progress by observing of the peak of the oxirane ring. Flexural strength and modulus of virgin matrix and recovered matrix samples were measured by four-point bending at room temperature (Instron 5567) with a 500 N load cell following ASTM D6272-17 [28]. The epoxy sheets were cured using a cure cycle consisting of a 1.5° C./min ramp rate, a 120° C. dwell of three hours, another 1.5° C./min ramp rate, and a post-cure at 180° C. for three hours. Test specimen dimensions were 110×12.7×3.2 mm. Five specimens were tested for each condition.

Results and Discussion

Recovered Epoxies

Figure 3:
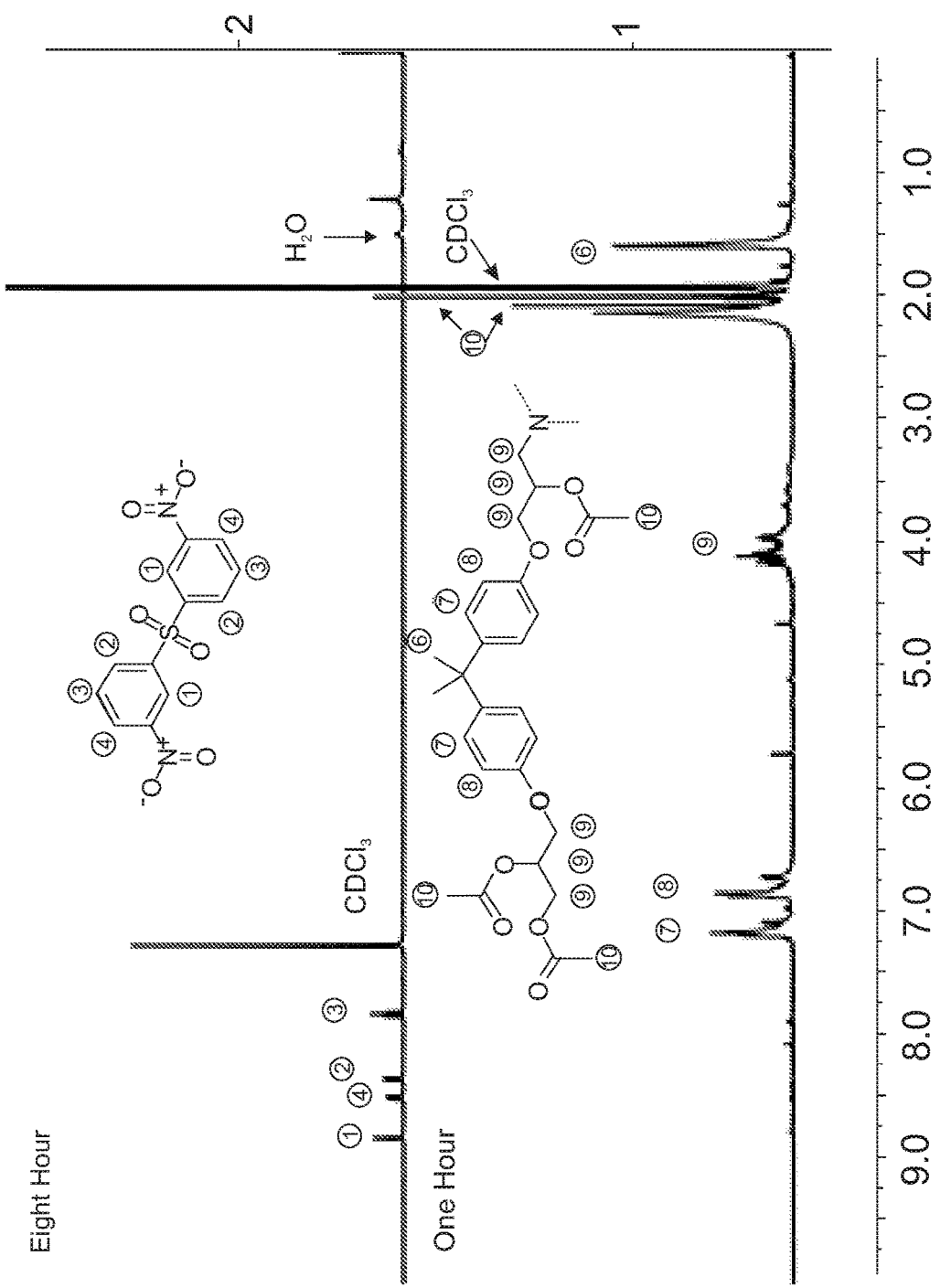
FIG. 3. Stacked $^1H$ proton spectra of the one-hour (bottom) digest in d3-acetonitrile and eight-hour (top) digest in deuterated chloroform. A mixture of derivatized bisphenol A compounds containing terminal acetate esters or tertiary amine groups is predicted for the one-hour digest.
Figure 10:
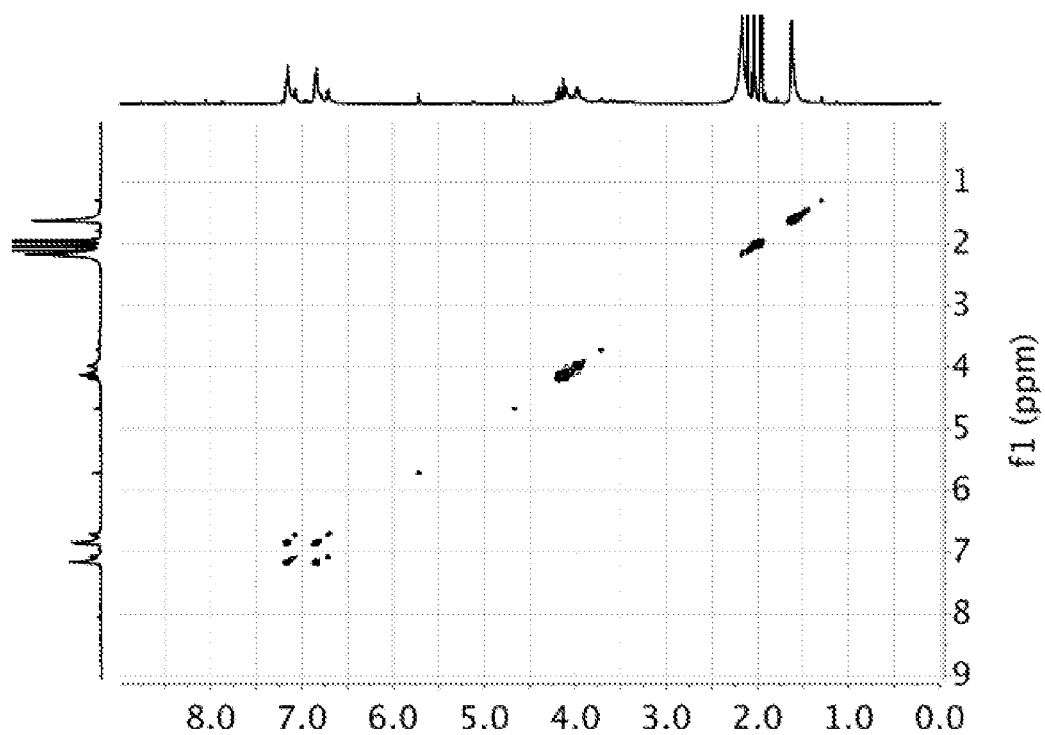
FIG. 10. $^1H$-$^1H$ homonuclear correlation spectroscopy (COSY) spectrum of the one-hour digest in di-acetonitrile supporting structural assignments and the statement that more than one para-substituted compound is present.
Figure 11:
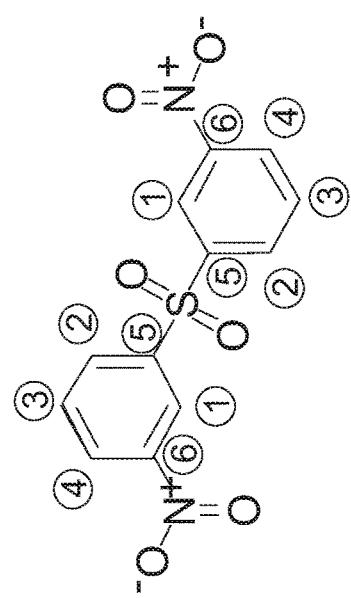
FIG. 11. $^{13}C$ NMR spectrum of 3,3'-dinitrodiphenyl sulfone obtained from the eight-hour digest in deuterated chloroform.

FIG. 3 shows that derivatized species of the glycidyl ether of bisphenol A are identified only in the one-hour digest. The $^1H$-$^1H$ homonuclear correlation spectroscopy (COSY) spectrum of the one-hour digest in acetonitrile-$d_3$ (FIG. 10) supports structural assignments and the conclusion that more than one para-substituted compound is present. The GC-MS data reported previously [8] also showed the existence of the bisphenol A structure in the dissolution products, confirming that the aromatic structures of the epoxies were preserved during dissolution. From the eight-hour sample, milligram quantities of 3,3'-dinitrodiphenyl sulfone were isolated, formed by the oxidation of 3,3'-diaminodiphenyl sulfone liberated during digestion. This conclusion was also supported by the $^{13}C$ NMR spectrum of 3,3'-dinitrodiphenyl sulfone obtained from the eight-hour digest (FIG. 11). These results indicate organic monomers liberated from the C—N bond cleavage continue to react and eventually decompose to low-value, small molecule organic compounds under the reaction conditions. Milder reagents are necessary to prevent over-oxidation of derivatized organic monomers.

We conclude from these observations that the recovered residues obtained after oxidative acid digestion contain bisphenol A from the epoxy monomer and tertiary amines from the amine-epoxy curing reaction. Thus, these components can be added to virgin epoxy formulations as accelerators and/or fillers for reuse. However, longer digesting times progressively decompose the matrix into smaller organics, reducing the value of the recovered components. Therefore, sustainable chemical recycling must not only focus on reclaiming high quality fibers, but also on recovery of useful matrix components for second-use.

Reuse Approach I: As Accelerators for Anhydride/Epoxy Formulation

Table I summarizes the reactivity of the matrix residues recovered from amine-cured epoxies when used as an accelerator for anhydride-based bi-functional epoxy formulations (without a commercial accelerator). In the absence of accelerators, no exothermic chemical reaction occurred, as expected. The $T_g$ of the epoxy with no accelerator was −40° C. after the cure cycle, confirming that the resin remained uncured. When 1 wt % commercial accelerator was added, the peak of the curing reaction occurred at 118.9° C., and the total heat of the reaction was 311.1 J/g, yielding a cured epoxy with $T_g$=126.8° C.

When the commercial accelerator was replaced with recovered matrix residues, the curing reaction was also initiated. As the amount of the matrix residue increased, the peaks of reaction decreased, because a greater concentration of tertiary amines provided more reactive sites. However, the $T_g$ and the heat of reaction of the cured epoxy first increased as the amount of the matrix residue increased, then decreased. The initial increase in $T_g$ was attributed to the higher crosslink density resulting from an increase in tertiary amine sites. The subsequent decrease in $T_g$ occurred when the mixing ratio reached 10 wt %, which was attributed to a greater concentration of non-reactive small molecules and short-chain polymers. Recovered matrices from composite laminates were also evaluated and compared with neat epoxy. Data showed that at the same mixing ratio, the cured $T_g$ values with those two materials were comparable, indicating that the existence of fiber reinforcement did not significantly affect the properties of recovered matrices.

TABLE 1

Assessment of using recovered amine/epoxy matrices as an accelerator for anhydride-based epoxy formulations.

| Accelerator Material | Ratio | Peak of Reaction [° C.] | Heat of reaction [J/g] | Cured $T_g$ [° C.] |
|---|---|---|---|---|
| None | 0 | / | / | −40 |
| Commercial accelerator | 0.5% | 118.9 | 311.1 | 126.8 |
| Matrix residue (neat epoxies, A/E = 40%) | 2.5% | 182.1 | 209.1 | 113.1 |
| | 5% | 170.9 | 222.3 | 114.7 |
| | 7.5% | 155.3 | 268.5 | 112.0 |
| | 10% | 159.9 | 218.3 | 103.6 |
| Matrix residue (composite, A/E = 100%) | 5% | 158.64 | 290.7 | 108.3 |

Figure 4A:
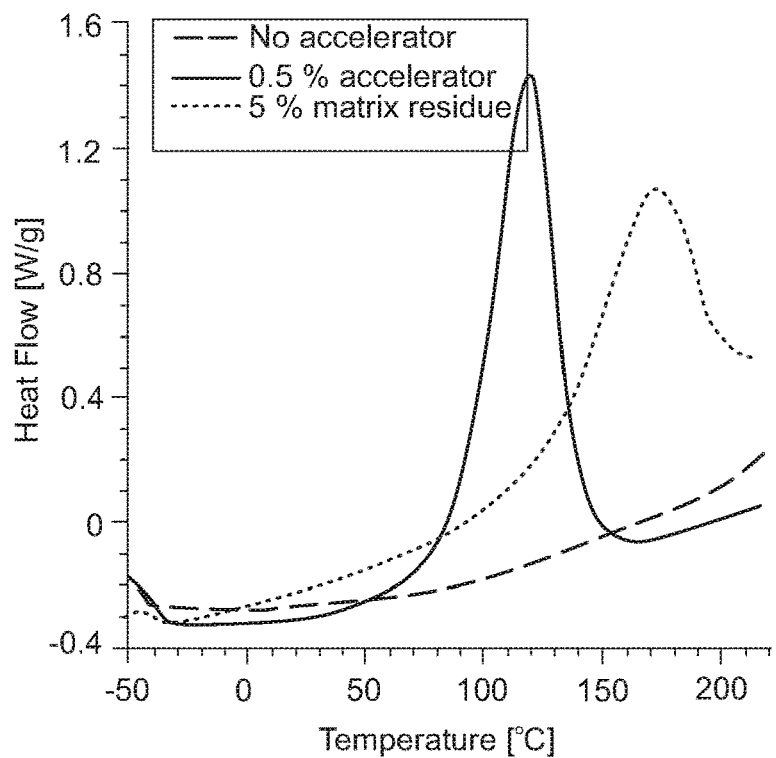
FIGS. 4A and 4B. Reuse of recovered matrix residues as an accelerator for an anhydride-based bi-functional epoxy formulation: (A) curing reactions, (B) TA values of cured epoxies.
Figure 4B:
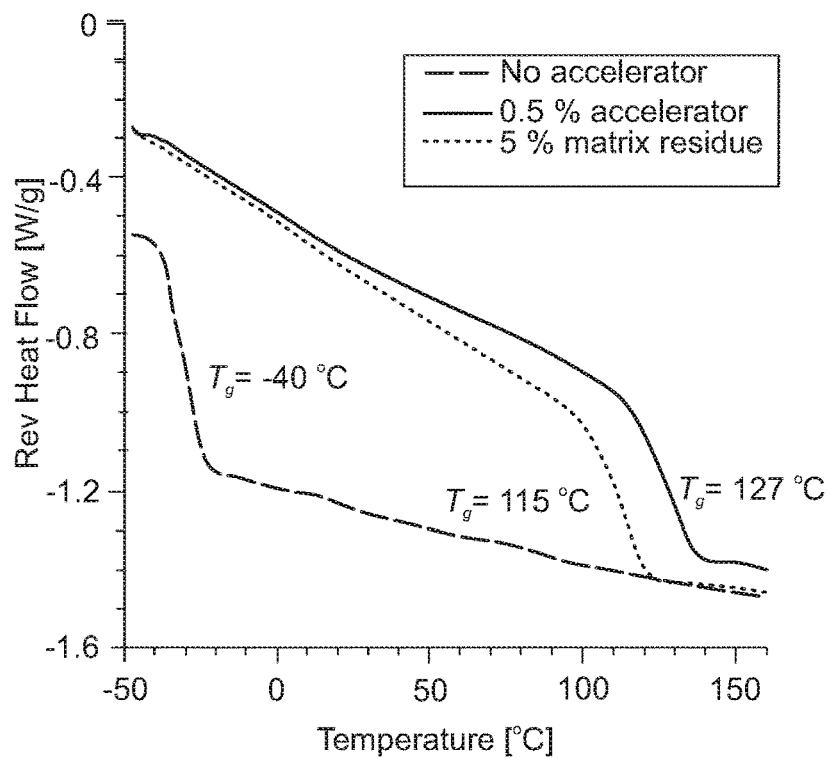

Based on the peaks of reaction, heats of reaction, and cured $T_g$ values, the optimal mixing ratio for reusing matrix residues as an accelerator in virgin anhydride-based epoxies was 5% by mass. FIG. 4 shows the representative heat flows and $T_g$ curves for anhydride/epoxy samples without an accelerator, with 0.5% commercial accelerator, and with 5% matrix residue. To verify the repeatability of these data, three anhydride/epoxy samples with 5% matrix residue loading were prepared and analyzed. The peaks of reaction, heats of reaction, and cured $T_g$ values were 170.5±0.9° C., 255.8±29.2 J/g and 117.2±7.5° C., respectively, indicating that the findings were repeatable within normal measurement bounds.

Figure 12A:
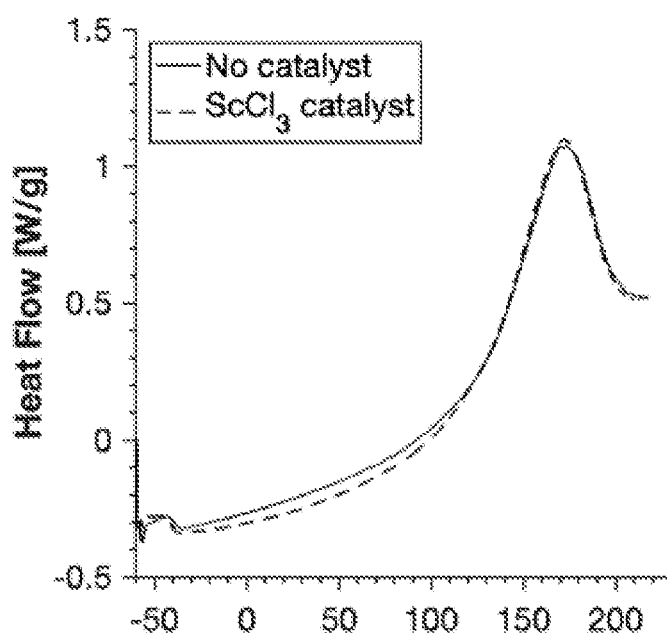
FIGS. 12A and 12B. Comparison of (A) curing reactions and (B) $T_g$ values for anhydride-based bifunctional epoxies with matrix residues without and with $ScCl_3$ catalyst.
Figure 12B:
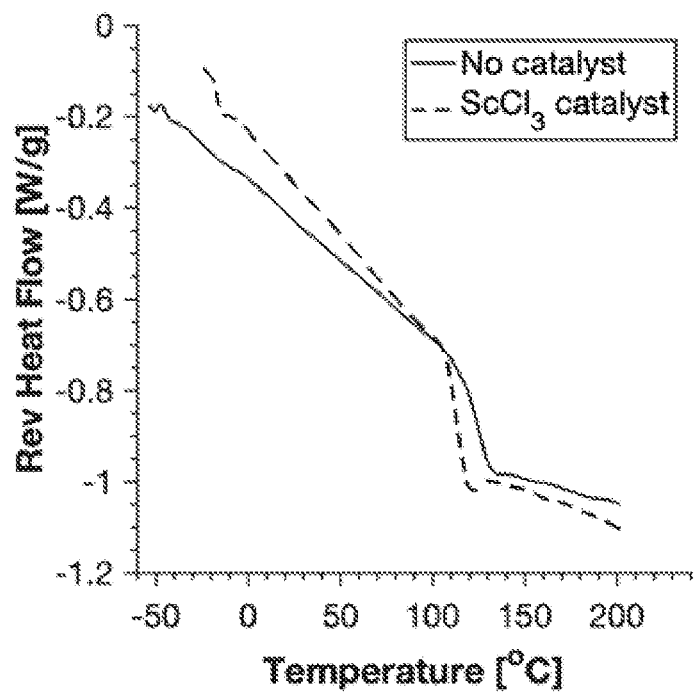

Previous studies reported that $ScCl_3$ effectively accelerated the chemical reaction for acid digestion of amine-cured epoxies [12]. In this study, the effectiveness of recovered matrix residues with and without $ScCl_3$ catalyst was compared (FIG. 12). The heat flow curves during cure for anhydride-based bi-functional epoxies with matrix residues with and without $SclC_3$ catalyst overlapped, and the cured $T_g$ values were comparable, indicating that the existence of metal salt catalysts during acid digestion had negligible effect on the curing reaction of epoxy blends containing matrix residues.

Figure 5:
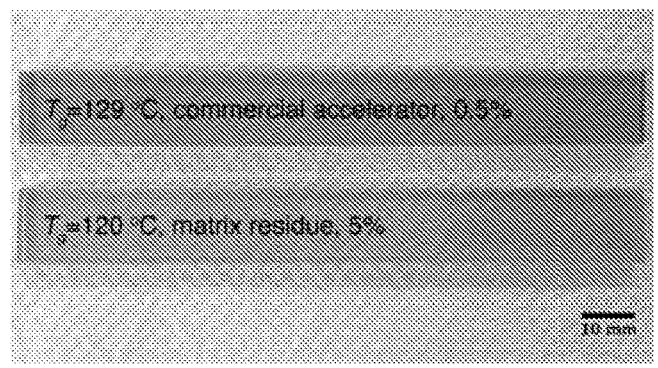
FIG. 5. Neat anhydride/epoxy specimens cured with a commercial accelerator (top) and with recovered amine/epoxy matrix residue (bottom)

To evaluate the flexural properties of the cured epoxies, neat epoxy specimens were prepared for four-point bending tests. FIG. 5 shows anhydride-cured bi-functional epoxy specimens cured with a commercial accelerator (top) and with recovered bi-functional matrix residue (bottom). Both cured specimens were homogenous and void-free. None of the bend test samples ruptured within the 5% strain limit required by the ASTM D6272 standard. The $T_g$ of the specimen cured with matrix residues was ca. 10° C. below the $T_g$ of the specimen cured with the commercial accelerator. The difference was attributed to the presence of small molecular segments and acetic acid residue in the recovered matrix, which was consistent with previous DSC data.

Figure 6A:
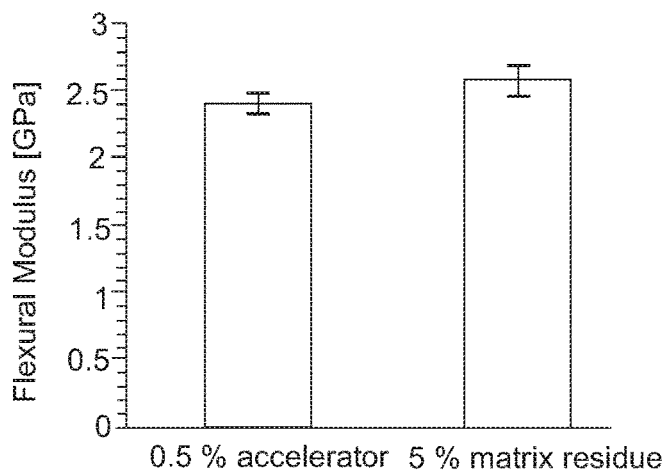
FIGS. 6A and 6B. Flexural modulus (A) and stress-strain curves (B) for anhydride/epoxy samples cured with a commercial accelerator and recovered matrices.
Figure 6B:
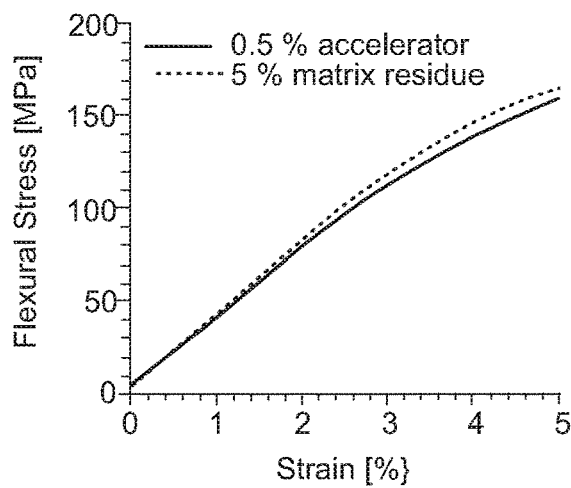

Despite the slight decrease in $T_g$ noted above, the flexural modulus of the specimens cured with matrix residues was greater than specimens with the commercial accelerator, as shown in FIG. 6. This phenomenon can be explained by a structural change in the polymer caused by reaction between hydroxyl groups in recovered matrices and epoxy monomers, introducing fragments from amine-cured epoxies into anhydride-cured epoxies. Aromatic amine-cured epoxies generally exhibit a greater storage modulus than anhydride-cured epoxies (using the same epoxy monomer) because of the higher functionality of amine, which yields a higher crosslinking density [29], as well as the rigid aromatic structures from the amine curing agents.

Figure 7:
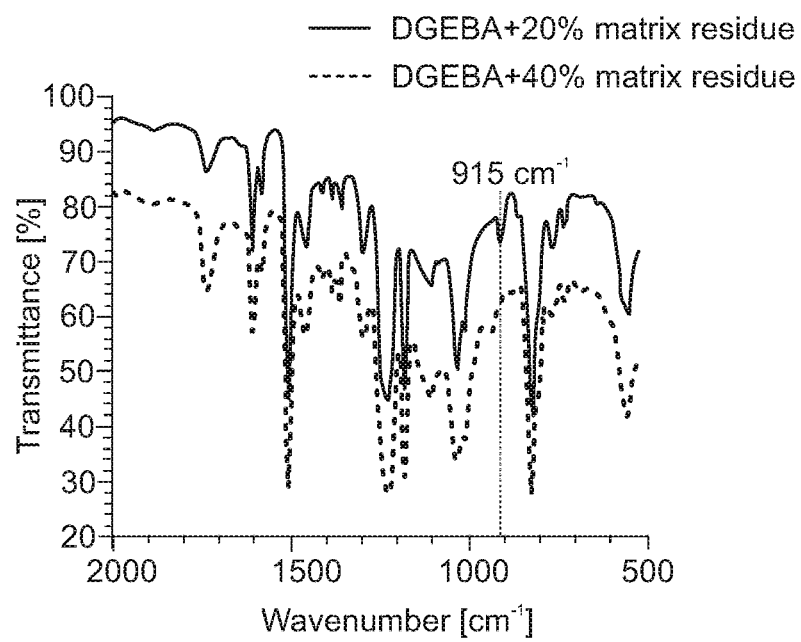
FIG. 7. FTIR spectra of DGEBA/matrix residue systems after a cure cycle.
Figure 13A:
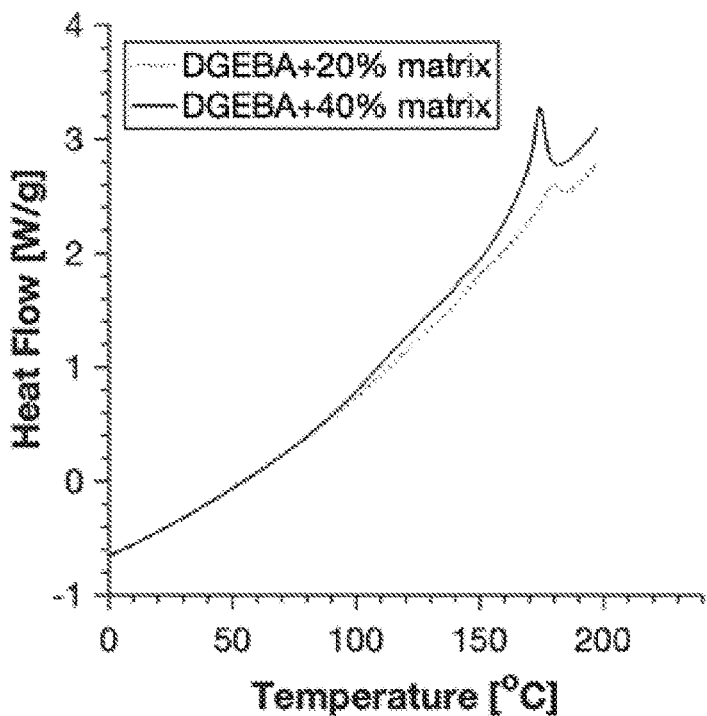
FIGS. 13A and 13B. (A) Curing reactions and (B) $T_g$ values of DGEBA/recovered matrix residue systems.
Figure 13B:
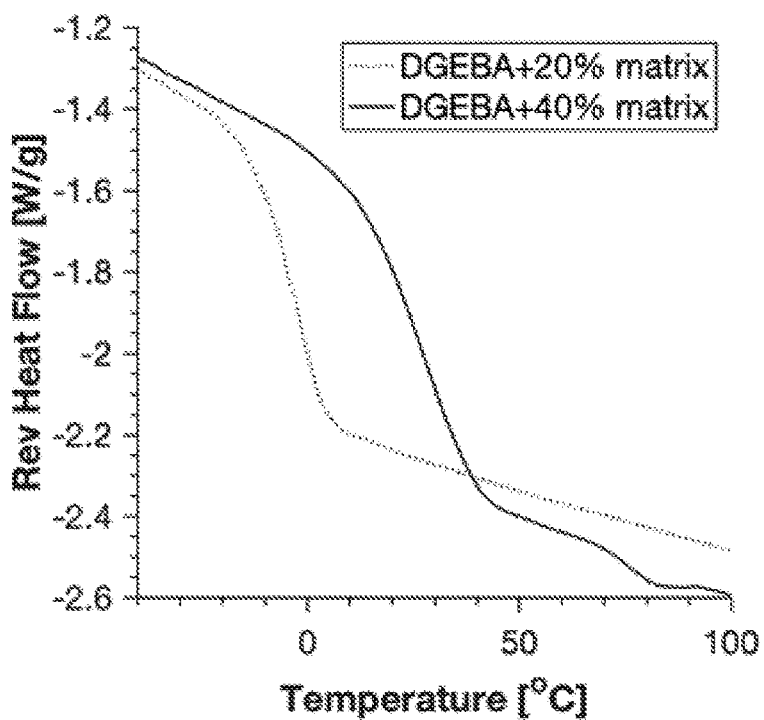
Figure 14:
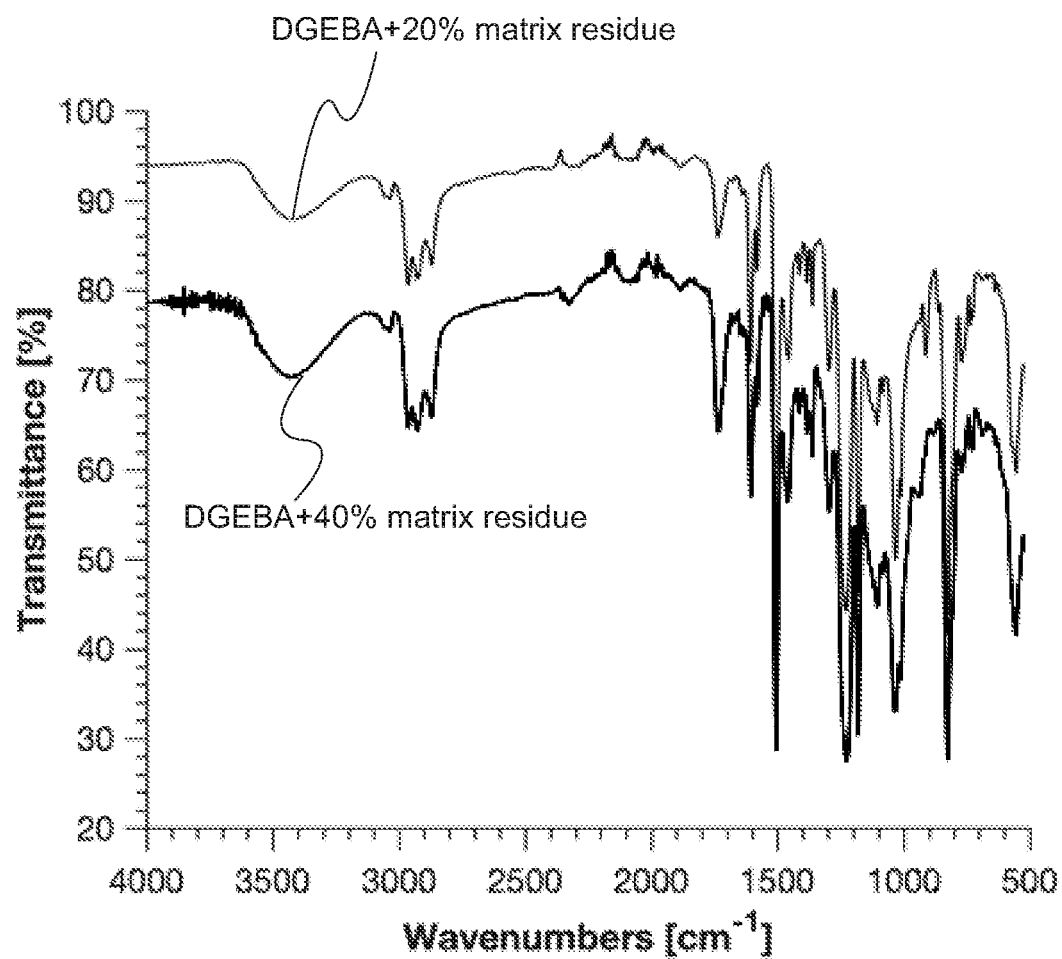
FIG. 14. Full FTIR spectra of DGEBA/recovered matrix residue systems after a cure cycle.

The chemical reactions between bi-functional epoxy monomer (DGEBA) and the recovered matrix residue were detected via MDSC (FIG. 13). At 40 wt % (of the resin) mixing ratio for the recovered matrix, the reaction took place at 174.3° C., yielding a partially cured epoxy with $T_g$=26.4° C. The peaks of reaction for DGEBA/recovered matrices and anhydride-cured DGEBA catalyzed by recovered matrices were similar, indicating that the two types of reactions occurred simultaneously during cure, and supporting our explanation. FIG. 7 shows the FTIR spectra of DGEBA cured with the matrix residues. The peak at 915 $cm^1$ was assigned to C—O stretching vibration in the oxirane ring [30], which became weaker as the mixing ratio of the recovered matrix increased from 20 to 40 wt % (of the resin), confirming that the matrix residues reacted with epoxy groups. The full FTIR spectra are shown in FIG. 14.

The observations presented above demonstrate that the matrix components recovered from oxidative acid digestion can be used as accelerators for those anhydride-based epoxy formulations that are not self-catalyzed during cure. A mixing ratio of 5% by mass provides accelerators for curing anhydride-based epoxies and yields the lowest reaction temperature and highest cured $T_g$. Epoxy samples cured with recovered matrix residues and commercial accelerators are both homogeneous and void-free. The $T_g$ and flexural modulus of the epoxy specimen cured with matrix residues are comparable to those of specimens cured with a commercial accelerator.

Reuse Approach II: As Fillers for Epoxy Resins

Figure 8:
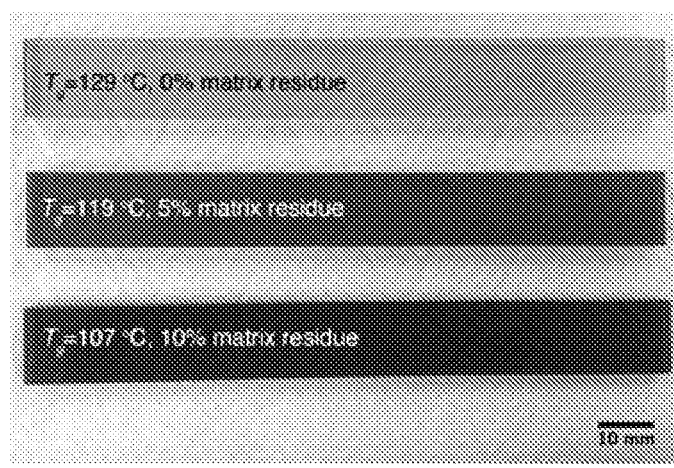
FIG. 8. Neat anhydride/epoxy specimens with recovered amine/epoxy matrix residues as fillers: 0% (top), 5% (middle), and 10% (bottom).

In this section, recovered matrix components were explored as filler additives to virgin anhydride-based epoxies with a commercial accelerator. Recovered matrix residues were blended into virgin resin formulations at mixing ratios of 5 and 10% by mass, and the thermal and mechanical properties were measured. FIG. 8 shows that specimens containing both 0% and 5% residue were homogenous and void-free. However, specimens with 10% residue showed a few trapped voids because of the higher acetic acid content. The $T_g$ values decreased as the mixing ratio of matrix residue increased. This phenomenon was ascribed to the increasing content of non-reactive small molecules and acetic acid solvent in the matrix residues. Note that the $T_g$ values for samples with 5% recovered matrix residue as an accelerator and as a filler are comparable.

Figure 9:
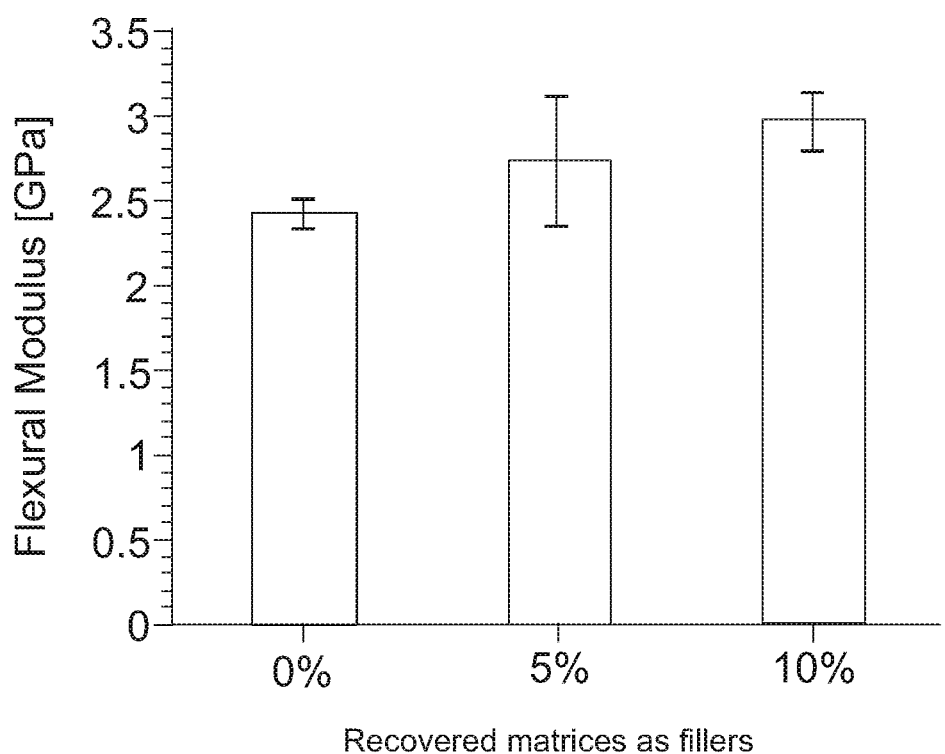
FIG. 9. Flexural modulus for anhydride/epoxy samples with 0%, 5%, and 10% recovered matrices as fillers.

To evaluate the flexural properties of the cured epoxies, neat epoxy specimens were prepared for four-point bend tests. The flexural modulus of the specimens increased as the matrix residue content increased, as shown in FIG. 9. The increase in modulus was attributed to the more rigid polymer chains brought by amine-epoxy structures, which was consistent the results of reusing matrix residues as an accelerator (Section [0069]). Note that the 0% and 5% specimens did not rupture within the 5% strain limit required by the ASTM D6272 standard. However, the 10% specimens ruptured within the 5% strain limit, and yielded a flexural strength of 141.5±22.0 MPa. Based on void content, cured $T_g$ value, and flexural properties, the maximum mixing ratio for reusing matrix residues as a filler in virgin anhydride-based epoxies was 10% by mass.

An effective process technology for recycling end-of-life CFRPs requires a high reaction rate, and three additional factors must be considered. First, a process must yield valuable recyclates after recycling. Current industrial scale pyrolysis recovers only short carbon fibers at end-of-life with reduced mechanical properties compared to virgin carbon fibers. Those short fibers are typically incorporated into bulk molding compounds (BMCs) or stitched mats, both of which embody much lower value than CFRPs with continuous carbon fiber reinforcement, and thus are unlikely to be eligible for subsequent recycling. Note that metals can be recycled repeatedly with negligible loss of material properties. Future recycling technologies must aim to recover near-virgin quality continuous carbon fibers (preferably without loss of organization), as well as high-value matrix residues.

Second, the recycling process must be economically feasible. In addition to diverting composites from landfills to comply with environmental legislation, composite recycling should include a reduction in cost/energy associated with producing virgin products to attract more recycling interest. For example, recycled aluminum and steel require 95% and 56% less energy, respectively [31]. The recovery and reuse of high-value matrix residues after chemical recycling not only closes the recycling loop, but also potentially reduce the overall cost of the process.

Finally, process scalability must be viable. Although valuable recyclates can be recovered via chemical recycling, current lab-scale processes require high pressure or hazardous reagents (corrosive or explosive). These conditions cannot be deployed readily in industry and must be modified/replaced. Mild recycling technologies also recover more value from end-of-life composites (high quality fibers and useful matrix residues), supporting and enabling the economic feasibility of recycling. The short production turnaround of chemical recycling is also a critical factor for entry into industrial scale recycling. This need is especially acute for advanced composites, which embody high intrinsic value but are difficult to recycle because of high crosslink densities.

Fully-Cured Composite Degradation Discussion:

Experiments on partially cured resin samples under aerobic manganese conditions were homogenized within 24 hours, and derivatized components of the material's polymer matrix constituent parts could be isolated. Fully cured composite samples, however, contain a significantly higher crosslinking density, which prevents reagent intercalation at aerobic manganese reaction temperature. To overcome this barrier, we swapped solvents to benzyl alcohol for its higher boiling point, raised the reaction temperature to 180° C., and increased the oxygen pressure to 10 atm. Under these conditions we recovered residue-free carbon fiber weaves, but the recovery of derivatized organic matrix components dropped significantly, so we sought milder methods to introduce the key oxidant for degrading the matrix. We looked to photo-generated $^1O_2$ to provide a more reactive oxygen source and observed that at 1 atm non-photoactivatex $^3O_2$. In $^1O_2$ conditions, the fully cured composite delaminates into four carbon fiber weaves. Although each ply is still stiff after this treatment, indicating unreacted matrix is present, it demonstrates this is a viable path to investigate and optimize for degrading fully cured composites.

Procedures for Fully-Cured Composite Degradation:

Aerobic manganese: The composite sample is pre-treated in benzyl alcohol at 180° C. for 4 hours to permeabilize the material. Afterwards, the composite is added to a solution of acetic acid containing 1 wt % $MnCl_2$ and $AlCl_3$ in a round bottom flask. The flask is purged, placed under an $O_2$ atmosphere, and let react for 16 hours at 120° C.

High Pressure $^3O_2$: The composite sample is pre-treated in benzyl alcohol at 180° C. for 4 hours to permeabilize the material. Afterwards, the composite is added to a solution of benzyl alcohol containing 10 wt % $MnCl_2$, and 10 equivalents of $K_3PO_4$ in a 100 mL Parr vessel. The Parr is pressurized to 10 atm $O_2$ and let react for 42 hours at 180° C.

Atmospheric $^1O_2$: The composite sample is placed in a solution of benzyl alcohol containing 10 equivalents of $K_3PO_4$ and 0.01 equivalent rose bengal in a round bottom flask. The flask is purged, placed under an $O_2$ atmosphere, and illuminated with a 250 watt halogen shop light for 40 hours at 180° C.

Figure 15:
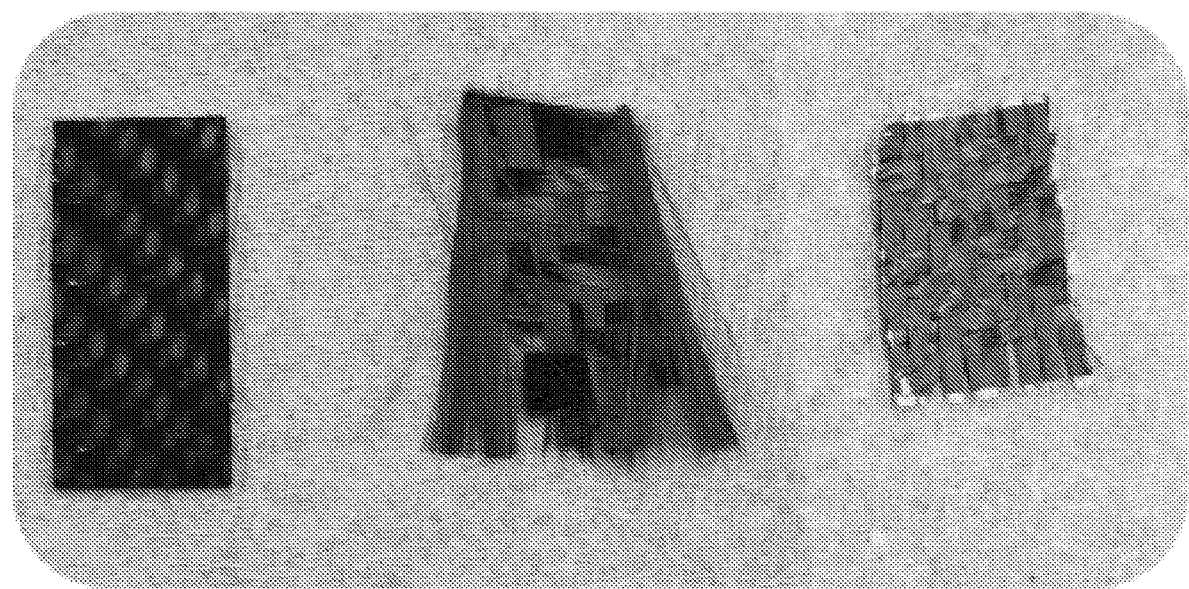
FIG. 15. Photo showing (left) a fully cured, four-ply composite sample, (center) a composite sample treated at 10 atm with $^3O_2$, and (right) a composite sample treated with 1 atm $^1O_2$.

FIG. 15 provides photos showing (left) a fully cured, four-ply composite sample, (center) a composite sample treated at 10 atm with $^3O_2$, and (right) a composite sample treated with 1 atm $^1O_2$.

CONCLUSIONS

We investigated the viability of recovering decomposed polymer matrix residues from amine-cured epoxies by acid digestion and reusing those matrix residues in virgin anhydride-based epoxy formulations. Useful matrix residues were recovered via neutralization and evaporation of the chemical solutions produced by oxidative acid digestion, and aromatic structures of epoxies were preserved during oxidative peroxide digestion. The recovered matrix residue had catalytic effects on the curing reaction of anhydride/epoxy formulations (without an accelerator) and could not otherwise be self-catalyzed. Furthermore, the thermal and flexural properties of anhydride-based epoxy samples cured with recovered matrix were comparable to samples cured with a commercial accelerator. We also demonstrated that the recovered matrix residue can also be reused as a filler in virgin anhydride/epoxy formulations (with a commercial accelerator), retaining thermal and mechanical properties.

The recovery of matrix residues deconstructed by oxidative acid digestion at atmospheric pressure affords opportunity to preserve useful parts of epoxy matrices in addition to carbon fibers, and to thus close the recycling loop. Moreover, the value recovered from matrices at least partially balances costs associated with acid digestion, rendering the process more cost effective for end-of-life recycling of composite materials, and reducing environmental impact.

Recyclability is essential to the sustainability of the growing composites industry. Without a robust and effective method to recycle composites and complete the material life-cycle, composite materials face challenges to replace steel and aluminum parts, for which recycling rates are already high. For example, the overall end-of-life recycling rates for steel and aluminum are presently >85% and 50%, respectively, and the average recycling rate for steel in automobiles is close to 100% [31-32]. In contrast, the current recycling rate for end-of-life CFRPs is <5% in industry [2], and only ca. 2% of composites-related companies are active recyclers [33]. Clearly, more effective recycling technologies are required to increase the end-of-life recycling rate of CFRPs.

An effective recycling process must yield valuable recyclates, be viable for scale-up, and be economically feasible. The oxidative acid digestion reaction described here does not fully satisfy these requisites. Although the acid digestion process effectively recovers near-virgin quality carbon fiber from composites, the chemical bond cleavage is not selective in the presence of $H_2O_2$, and thus the recovered value from the polymer matrix is limited. Moreover, $H_2O_2$ is a costly and explosive reagent that cannot be deployed on an industrial scale. Consequently, present efforts are devoted to seeking safer oxygen source alternatives to $H_2O_2$ for oxidative acid digestion that can be deployed to recover high quality fibers and more valuable polymers from amine/epoxy composites. We also aim to develop more effective catalysts to yield faster reactions, possibly sufficient to meet present and future needs. Until a more viable recycling process is developed for CFRPs, the use of composites to substitute for traditional aluminum and steel parts will be restricted, particularly in mass market applications such as automotive and infrastructure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1]. M. Holmes, Global carbon fibre market remains on upward trend, Reinf. Plast. 58 (2014) 38-45. doi:10.1016/S0034-3617(14)70251-6.
[2]. M. Holmes, Recycled carbon fiber composites become a reality, Reinf. Plast. 62 (2018) 148-153. doi:10.1016/j.repl.2017.11.012.
[3]. S. Pimenta, S. T. Pinho, The influence of micromechanical properties and reinforcement architecture on the mechanical response of recycled composites, Compos. Part A Appl. Sci. Manuf. 56 (2014) 213-225. doi:10.1016/j.compositesa.2013.10.013.
[4]. M. Dauguet, O. Mantaux, N. Perry, Y. F. Zhao, Recycling of CFRP for high value applications: Effect of sizing removal and environmental analysis of the Super Critical Fluid Solvolysis, Procedia CIRP. 29 (2015) 734-739. doi:10.1016/j.procir.2015.02.064.
[5]. G. Oliveux, J. L. Bailleul, A. Gillet, O. Mantaux, G. A. Leeke, Recovery and reuse of discontinuous carbon fibres by solvolysis: Realignment and properties of remanufactured materials, Compos. Sci. Technol. 139 (2017) 99-108. doi:10.1016/j.compscitech.2016.11.001.
[6]. Y. Ma, Chemical recycling of amine/epoxy composites at atmospheric pressure, Doctoral Dissertation, University of Southern California (2019). http://digitallibrary.usc.edu/cdm/ref/collection/p15799col189/id/125492
[7]. Y. Ma, S. R. Nutt, Chemical treatment for recycling of amine/epoxy composites at atmospheric pressure, Polym. Degrad. Stab. 153 (2018). doi:https://doi.org/10.1016/j.polymdegradstab.2018.05.011.
[8]. Y. Ma, D. Kim, S. R. Nutt, Chemical treatment for dissolution of amine-cured epoxies at atmospheric pressure, Polym. Degrad. Stab. 146 (2017) 240-249, doi: 10.1016/j.polymdegradstab.2017.10.014.
[9]. Y. Ma, D. Kim, and S. R. Nutt, A parametric study of the recyclability of carbon fiber reinforced polymers. Proc of the Society for the Advancement of Material and Process Engineering (SAMPE) Technical Conference, Long Beach, CA, May 23-26, (2016).
[10]. Y. Ma, D. Kim, T. J. Williams, and S. R. Nutt, Recycling of carbon fiber composites using chemical treatment: reaction characterization and optimization. Proc of the 2017 Society for the Advancement of Material and Process Engineering (SAMPE) Technical Conference, Seattle, WA, May 22-25, (2017).
[11]. Y. Ma, T. J. Williams, and S. R. Nutt, Recycling of amine/epoxy composites using chemical treatment at atmospheric pressure. Proc of the 2017 Society for the Advancement of Material and Process Engineering (SAMPE) Technical Conference, Long Beach, CA, May 21-24, (2018).
[12]. C. A. Navarro, E. A. Kedzie, Y. Ma, K. H. Michael, S. R. Nutt, T. J. Williams, Mechanism and Catalysis of Oxidative Degradation of Fiber-Reinforced Epoxy Composites, Top. Catal. 0 (2018) 1-4. doi:10.1007/s11244-018-0917-2.
[13]. S. J. Pickering, Recycling technologies for thermoset composite materials-current status, Compos. Part A Appl. Sci. Manuf. 37 (2006) 1206-1215. doi:10.1016/j.compositesa.2005.05.030.
[14]. R. Piñero-Hernanz, J. Garcia-Serna, C. Dodds, J. Hyde, M. Poliakoff, M. J. Cocero, S. Kingman, S. Pickering, E. Lester, Chemical recycling of carbon fibre composites using alcohols under subcritical and supercritical conditions, J. Supercrit. Fluids. 46 (2008) 83-92. doi:10.1016/j.supflu.2008.02.008.
[15]. J. R. Hyde, E. Lester, S. Kingman, S. Pickering, K. H. Wong, Supercritical propanol, a possible route to composite carbon fibre recovery: A viability study, Compos. Part A Appl. Sci. Manuf. 37 (2006) 2171-2175. doi: 10.1016/j.compositesa.2005.12.006.
[16]. G. Jiang, S. J. Pickering, E. H. Lester, T. A. Turner, K. H. Wong, N. A. Warrior, Characterisation of carbon fibres recycled from carbon fibre/epoxy resin composites using supercritical n-propanol, Compos. Sci. Technol. 69 (2009) 192-198. doi:10.1016/j.compscitech.2008.10.007.

[17]. T. Iwaya, S. Tokuno, M. Sasaki, M. Goto, K. Shibata, Recycling of fiber reinforced plastics using depolymerization by solvothermal reaction with catalyst, J. Mater. Sci. 43 (2008) 2452-2456. doi:10.1007/s10853-007-2017-8.

[18]. P. Xu, J. Li, J. Ding, Chemical recycling of carbon fibre/epoxy composites in a mixed solution of peroxide hydrogen and N,N-dimethylformamide, Compos. Sci. Technol. 82 (2013) 54-59. doi:10.1016/j.compscitech.2013.04.002.

[19]. M. Das, S. Varughese, A novel sonochemical approach for enhanced recovery of carbon fiber from CFRP waste using mild acid-peroxide mixture, ACS Sustain. Chem. Eng. 4 (2016) 2080-2087. doi:10.1021/acssuschemeng.5b01497.

[20]. M. Das, R. Chacko, S. Varughese, An Efficient Method of Recycling of CFRP Waste Using Peracetic Acid, ACS Sustain. Chem. Eng. 6 (2018) 1564-1571 Research. doi: 10.1021/acssuschemeng.7b01456.

[21]. J. Li, P. Xu, Y. Zhu, J. Ding, L. Xue, Y. Wang, A promising strategy for chemical recycling of carbon fiber/thermoset composites: self-accelerating decomposition in a mild oxidative system, Green Chem. 14 (2012) 3260-3263. doi:10.1039/c2gc36294e.

[22]. I. Okajima, M. Hiramatsu, Y. Shimamura, T. Awaya, T. Sako, Chemical recycling of carbon fiber reinforced plastic using supercritical methanol, J. Supercrit. Fluids. 91 (2014) 68-76. doi:10.1016/j.supflu.2014.04.011.

[23]. T. Liu, X. Guo, W. Liu, C. Hao, L. Wang, W. C. Hiscox, C. Liu, C. Jin, J. Xin, J. Zhang, Selective cleavage of ester linkages of anhydride-cured epoxy using a benign method and reuse of the decomposed polymer in new epoxy preparation, Green Chem. 19 (2017) 4364-4372. doi: 10.1039/c7gc01737e.

[24]. T. Liu, M. Zhang, X. Guo, C. Liu, T. Liu, J. Xin, J. Zhang, Mild chemical recycling of aerospace fiber/epoxy composite wastes and utilization of the decomposed resin, Polym. Degrad. Stab. 139 (2017) 20-27[1] T. Liu, M. Zhang, X. Guo, C. Liu, T. Liu. doi:10.1016/j.polymdegradstab.2017.03.017.

[25]. W. Dang, M. Kubouchi, H. Sembokuya, K. Tsuda, Chemical recycling of glass fiber reinforced epoxy resin cured with amine using nitric acid, Polymer (Guildf). 46 (2005) 1905-1912. doi:10.1016/j.polymer.2004.12.035.

[26]. L. Matějka, J. Lövy, S. Pokorný, K. Bouchal, K. Dušek, Curing epoxy resins with anhydrides. Model reactions and reaction mechanism, J. Polym. Sci. Polym. Chem. Ed. 21 (1983) 2873-2885. doi:10.1002/pol.1983.170211003.

[27]. F. Kolář, J. Svìtilovà, Kinetics and mechanism of curing epoxy/anhydride systems, Acta Geodyn. Geomater. 4 (2007) 85-92.

[28]. ASTM D6272-17, Standard test methods for flexural properties of unreinforced and reinforced plastics and electrical insulating materials by Four-Point Bending1. (2017).

[29]. W.-F. A. Su, K. C. Chen, S. Y. Tseng, Effects of chemical structure changes on thermal, mechanical, and crystalline properties of rigid rod epoxy resins, J. Appl. Polym. Sci. 78 (2000) 446-451. doi:10.1002/1097-4628(20001010)78:2<446::AID-APP250>3.0.CO; 2-W.

[30]. S. T. Cholake, M. R. Mada, R. K. Singh Raman, Y. Bai, X. L. Zhao, S. Rizkalla, S. Bandyopadhyay, Quantitative analysis of curing mechanisms of epoxy resin by mid- and near-fourier transform infra red spectroscopy, Def. Sci. J. 64 (2014) 314-321. doi:10.14429/dsj.64.7326.

[31]. R. Leblanc, About metal recycling: an introduction to scrap metal recycling. https:i/www.thebalancesmb.com/about-metal-recycling-2877921 [last accessed November 2018]

[32]. T. E. Graedel, J. Allwood, J. P. Birat, M. Buchert, C. Hagelüken, B. K. Reck, S. F. Sibley, G. Sonnemann, What do we know about metal recycling rates?, J. Ind. Ecol. 15 (2011) 355-366. doi:10.1111/j.1530-9290.2011.00342.x.

[33]. S. Black, Composites recycling is gaining traction, CompositesWorld https://www.compositesworld.com/blog/post/composites-recycling-is-gaining-traction [last accessed November 2018]

What is claimed is:

1. A method for recycling matrix residues, the method comprising:
    degrading a target epoxy to form matrix residue materials;
    collecting the matrix residue materials; and
    adding the matrix residue materials into a polymer-forming formulation, the polymer-forming formulation including multifunctional anhydride monomers and polyfunctional co-reactant monomers, wherein the matrix residues are a filler for the polymer-forming formulation.

2. The method of claim 1 wherein the target epoxy is an amine-cured epoxy.

3. The method of claim 1 wherein the polymer-forming formulation is an anhydride-based formulation.

4. The method of claim 1 wherein the target epoxy is contacted with an acidic solution for a predetermined time period to form a reacted mixture.

5. The method of claim 4 wherein the acidic solution includes hydrogen peroxide and acetic acid.

6. The method of claim 5 wherein the reacted mixture is neutralized.

7. The method of claim 6 wherein viscous liquids and/or solid powder residues are precipitated from the reacted mixture.

8. The method of claim 5 wherein matrix residues are obtained from the reacted mixture by evaporation of the acetic acid.

9. The method of claim 4 wherein the acidic solution contains acetic acid and is exposed to oxygen.

10. The method of claim 9 wherein the reacted mixture is neutralized.

11. The method of claim 9 wherein matrix residues are obtained from the reacted mixture by evaporation of the acetic acid.

12. The method of claim 1 wherein the target epoxy is contacted with a neutral solution for a predetermined time period to form a reacted mixture.

13. The method of claim 12 wherein the neutral solution includes benzyl alcohol.

14. The method of claim 1 wherein the matrix residues are an activator for the polymer-forming formulation of a thermoset resin system, the matrix residues including amine or hydrazine functional groups.

15. The method of claim 14 wherein the thermoset resin system is an anhydride-based formulation.

16. The method of claim 14 wherein the matrix residues are present in an amount of about 1 to 20 weight percent of the polymer-forming formulation.

17. The method of claim 14 wherein the target epoxy is formed from a multifunctional amine-containing epoxide monomer.

18. The method of claim 17 wherein the multifunctional amine-containing epoxide monomer is selected from the group consisting of triglycidyl-p-aminophenol, tetraglycidyl-4,4'-diaminodiphenylmethane, and combinations thereof.

19. The method of claim 14 wherein the matrix residues include reside of multifunctional amine-containing epoxide monomers or hydrazine functionalized derivatives thereof.

20. A method for recycling matrix residues, the method comprising:
degrading a target epoxy to form matrix residue materials;
collecting the matrix residue materials;
adding the matrix residue materials into a polymer-forming formulation, the polymer-forming formulation including multifunctional anhydride monomers and polyfunctional co-reactant monomers; and
contacting the target epoxy with an acidic solution for a predetermined time period to form a reacted mixture, wherein the acidic solution includes acetic acid and is exposed to oxygen.

21. The method of claim 20, wherein the target epoxy is an amine-cured epoxy.

22. The method of claim 20, wherein the polymer-forming formulation is an anhydride-based formulation.

23. The method of claim 20, wherein the matrix residues are an activator for the polymer-forming formulation of a thermoset resin system, the matrix residues including amine or hydrazine functional groups.

24. The method of claim 23, wherein the target epoxy is formed from a multifunctional amine-containing epoxide monomer.

25. The method of claim 24, wherein the multifunctional amine-containing epoxide monomer is selected from the group consisting of triglycidyl-p-aminophenol, tetraglycidyl-4,4'-diaminodiphenylmethane, and combinations thereof.

26. A method for recycling matrix residues, the method comprising:
degrading a target epoxy to form matrix residue materials;
collecting the matrix residue materials;
adding the matrix residue materials into a polymer-forming formulation, the polymer-forming formulation including multifunctional anhydride monomers and polyfunctional co-reactant monomers; and
contacting the target epoxy with an acidic solution for a predetermined time period to form a reacted mixture, wherein the acidic solution includes hydrogen peroxide and acetic acid and wherein matrix residues are obtained from the reacted mixture by evaporation of the acetic acid.

27. The method of claim 26, wherein the target epoxy is an amine-cured epoxy.

28. The method of claim 26, wherein the polymer-forming formulation is an anhydride-based formulation.

29. The method of claim 26, wherein the matrix residues are an activator for the polymer-forming formulation of a thermoset resin system, the matrix residues including amine or hydrazine functional groups.

30. The method of claim 29, wherein the target epoxy is formed from a multifunctional amine-containing epoxide monomer.

31. The method of claim 30, wherein the multifunctional amine-containing epoxide monomer is selected from the group consisting of triglycidyl-p-aminophenol, tetraglycidyl-4,4'-diaminodiphenylmethane, and combinations thereof.

* * * * *